Feb. 24, 1931. F. M. SCHULER 1,793,751
APPARATUS FOR HANDLING CANDY
Filed July 30, 1926
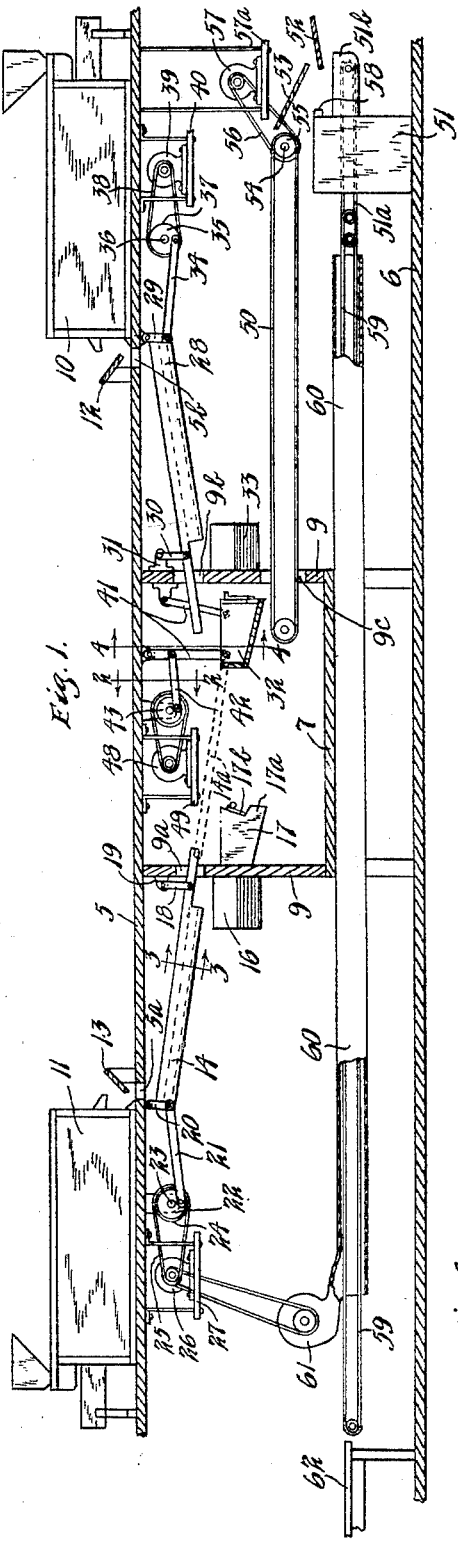
INVENTOR.
FRANK M. SCHULER.
BY HIS ATTORNEYS.

Patented Feb. 24, 1931

1,793,751

UNITED STATES PATENT OFFICE

FRANK M. SCHULER, OF WINONA, MINNESOTA

APPARATUS FOR HANDLING CANDY

Application filed July 30, 1926. Serial No. 125,933.

This invention relates to an apparatus for making candy and particularly to an apparatus for handling candy in the factory during the manufacture thereof. A great deal of the candy now commercially made and sold comprises pieces having a coating of chocolate thereon and having centers of a different material. The centers are commonly formed in machines and by placing material in molds formed in trays of fine starch. These centers are afterward coated with the chocolate. Before the pieces pass to the coating or enrobing machine and to be properly coated, they must be of proper temperature. For this purpose a tempering room is provided in the factory to which the pieces are taken. It has heretofore been the practice to collect the center pieces and take them from various parts of the factory to the tempering room. They would be kept in the tempering room for various periods and would be brought to the temperature of the tempering room. Sometimes the pieces would have to be again hauled out of the tempering room and warmed somewhat before going to the enrobers. All of this necessitated a great deal of hauling of the candy in and out of the tempering room before the pieces were coated and at the time it was desired to coat the same.

It is an object of this invention to so arrange the candy making machines, the tempering room and the enrobing machines so that the candy is automatically delivered to the desired places without unnecessary handling, whereby the entire candy making operation may be continuous from the beginning until the candy reaches the packing room.

It is a further object of the invention to provide a method and apparatus for making candy in which the machines which make the candy centers are disposed upon one floor of a building, the tempering room is disposed at a lower level and the enrobing machines are on the floor below the first mentioned floor, whereby the center pieces may be delivered directly to the tempering room on gravity conveyors and automatically carried on carriers when desired, to the enrobing machines, the candy passing automatically from the enrobing machines through a cooling or warming space to the packing room.

It is more specifically an object of the invention to provide a candy making apparatus in which a plurality of machines for making the candy centers are disposed on an upper floor, which machines deliver the candy to chutes or conveyors which are suitably actuated and down which the candy moves by gravity, which conveyors are equipped with means for brushing the candy and separating superfluous starch therefrom, receptacles being provided to receive the separated starch and said conveyors delivering to hoppers in the tempering room, together with a carrier to which the candy may automatically be fed, which carrier extends to the receiving end of one or more enrobing machines, a conveyor extending from the delivery end of the enrobing machine through a cooling tunnel to the packing room.

These and other objects and advantages of the invention will be fully set forth in the following description made in connection with the accompanying drawings, in which like reference characters refer to similar parts throughout the several views and in which:—

Fig. 1 is a somewhat diagrammatical view showing a section through the floors of a building, with some of the apparatus shown in side elevation and some in vertical section;

Fig. 2 is a view in vertical section taken on line 2—2 of Fig. 1;

Fig. 3 is a view in vertical section taken on line 3—3 of Fig. 1; and

Fig. 4 is an end view of a portion of the apparatus as seen from the position indicated by line 4—4 of Fig. 1 looking in the direction of the arrow.

Referring to the drawings, one floor of a building or candy factory is indicated as 5 and a lower floor of said building as 6. A tempering room is provided, having a floor 7 which is at a lower level than the floor 5, the walls of said room being indicated as 9. On the floor 5 are disposed a plurality of candy making machines or machines for making the candy centers, of which two, 10 and 11 are illustrated in the drawing. These machines will be of the type now commonly known as the Mogul or may be of the type known as the starch buck in which the candy pieces are separated from the starch, the candy pieces being discharged at one end of the machine. The candy pieces discharged from the machines 10 and 11 will be delivered either directly or by carriers to the chutes 12 and 13 respectively, from which the candy will be discharged through openings 5a in the floor 5. The candy discharged from the machines 11 and the chute 13 will fall upon a shaking trough or conveyor 14, the upper end of which is below the opening 5a. The chute 14 is of considerable width and as shown in Fig. 3 the same has a screen 14a extending thereacross adjacent its top. A plurality of brushes 15 have their ends projecting through the screen 14a and are carried in a screen 14b extending across the trough below the screen 14a. The trough has an imperforate bottom 14c below the screen 14b. The top portion of the trough and the screen 14a extend beyond the bottom portion and the screen 14b and project through an opening 9a in one of the walls 9. The bottom portion 14c of the trough terminates at one side of the wall 9 and above a receptacle 16 supported on said wall adapted to receive the starch discharged from said trough. The end of chute 14 which projects through the wall 9 is disposed over and adapted to discharge into one or more of a plurality of hoppers or receptacles 17 having a delivery spout 17a closed by a slide 17b. The lower end of chute 14 which projects through opening 9a is provided as shown in Fig. 4 with a central swingable partition 14d and has deflectors 14e at its lower end by means of which the material can be directed into the different hoppers or receptacles 17. The chute 14 is shown as being swingably supported at its lower end by a link 18 pivoted at its upper end to a bracket 19 secured to the wall 9. Said chute is supported at its upper end by a link 20 pivotally supported beneath the floor 5 and pivoted to the chute 14. Said chute is adapted to be reciprocated by a pitman 21 pivotally connected thereto preferably by the pivot connecting the lower end of the link 20 and pivotally connected at its upper end to a disk 22 secured to a shaft 23 driven by and having secured thereto a pulley 24. The pulley 24 is driven by a belt 25 running over the driving pulley of a suitable motor 26 supported on a bracket 27 which is hung from the under side of the floor 5.

The candy passing through the opening 5b falls upon a downwardly inclined chute 28. The chute 28 is also of some width and is of a construction already described for chute 14 having the imperforate bottom portion and the brush carrying screen portions thereabove. The chute 28 is supported at its upper and lower ends by the links 29 and 30 respectively, the former of which is pivoted to a bracket secured to the under side of the floor 5 and the latter of which is secured to a bracket 31 secured to the outer side of one of the walls 9. The upper end of chute 28 projects through an opening 9b in one of the walls 9 and has its end disposed above a plurality of hoppers or receptacles 32 located in the tempering room between the walls 9. The lower portion of the chute 28 is constructed similar to the lower portion of the chute 14 as shown in Fig. 4 so as to discharge into different receptacles 32. The bottom of chute 28 terminates at the outer side of the wall 9 and over a receptacle 33 supported on the wall 9 and adapted to receive the starch discharged from said chute. The chute 28 is adapted to be reciprocated by link or pitman 34 pivotally connected to the upper end of the chute and pivoted at its other end to a crank disk 35 carried on a shaft 36 supported in brackets depending from floor 5. Shaft 36 has secured thereto, and is driven by a pulley 37 over which runs a belt 38 also running over the driving pulley of a motor 39 mounted on a bracket 40 hung from the under side of floor 5. The receptacles 32 are swingingly supported on links 41 pivotally connected at their upper ends to brackets mounted respectively on the under side of the floor 5 and on the inside of the wall 9 and said receptacles are adapted to be reciprocated by a pitman link 42 pivotally connected at one end to one of the links 41 and at its other end to a crank disk 43 secured to a shaft 44 mounted in bearings 45 depending from the under side of the floor 5 and carrying a pulley 46. Pulley 46 is driven by a belt 47 running thereover and over the driving pulley of a suitable motor 48 mounted on a bracket 49 hung from the under side of the floor 5.

The enrobing machines 51 are located on the floor 6 beneath the floor 5 and these machines comprise an endless conveyor 51a on which the candy is placed at the receiving end 51b of the machine. The operator stands at the receiving end of the machine and takes the candy from the feed board or plate 52 and places the same on the conveyor 51a. Endless conveyors 50 are provided having one end thereof extending into the tempering room through an opening 9c in one of the walls 9 and having said end disposed to receive from the receptacles 32. The conveyors 50 extend to a point over the enrobers 51 and discharge onto the downwardly inclined chute 53 which in turn discharges onto the feeding plate or board 52. The conveyors 50 have driving shafts 54 carrying pulleys 55 driven by the belt 56, each of which runs over the driving pulley of a suitable motor 57 mounted on a bracket 57a preferably hung by suitable supports from the under side of the floor 5. Controlling switches 58 will be provided on or adjacent the enrobing machines 51 so as to be in convenient position for manipulation by the operator, which switches will be constructed to start the motors 57 and the motors 48. The conveyor 51a of the enrobing machine discharges to a conveyor 59 which conveyor travels through a cold air tunnel 60 constructed to pass below the floor 7 of the tempering room, which tunnel is supplied with cold air by a fan or blower 61 taking its supply of air from a cooling room through a suitable conduit. The conveyors 59 extend to a packing room having therein the tables 62 onto which the coated and finished candy pieces are discharged. The candy is packed into suitable cartons or boxes by the operators in the packing room.

In carrying out applicant's method and in the use of the apparatus disclosed, the candy pieces discharged from the machines 10 and 11 are carried to and discharged by the chutes 12 and 13 respectively to the chutes 28 and 14 respectively. The candy is moved down the chutes 28 and 14 by the reciprocating motion thereof and by the inclination of said chutes, and any superfluous starch remaining on the pieces of candy will be brushed off by the brushes in the chutes, which starch will pass through screens in the chutes to the bottoms of said chutes. Starch will be discharged from the receptacles 16 and 33. The candy pieces will move down on the top screen and will be discharged into the receptacles 17 and 32. If the pieces of candy can quickly be brought to the right temperature to be coated, they may pass on through the receptacles 32 to the conveyors 50 and to the enrobing machines 51. A chute 14a is used at such times to convey the candy from chute 14 to receptacles 32. The tempering room is kept at a substantially uniform temperature which is approximately the temperature to which the candy should be brought to be coated. The candy may have to remain a longer or shorter time in the tempering room and if so, the same will be received from the chutes 14 and 28 and placed on trays where it will remain in the tempering room until it has attained the desired temperature. An operator, therefore, may be necessary in the tempering room. When the operator at the enrobing machine wishes to start the coating process, she will operate the switch 58 which will start the motors 57 and 48. Candy will then be fed from the receptacle 32 feeding the conveyor 50 running to the enrobing machine served by said operator. Candy will be fed by the reciprocating motion of receptacle 32 on the conveyor 50 and will be discharged onto the chute 53 and the feeding plate 52 where it can conveniently be reached by the operator and placed on the enrobing machine. The candy leaving the enrobing machine is, as previously stated, received on the conveyor 59 passed through the tempering tunnel 60 and conveyed to the packing room 63. By applicant's process and apparatus, therefore, the candy is conveniently and automatically traversed from one floor to the tempering room at a lower level and it is conveniently taken from the tempering room to the enrobing machines when desired. It is unnecessary, therefore, to move the candy about the factory in carts or containers carried by the operator. As stated, there will be a plurality of candy making machines and the candy from the various machines will be brought to the chute discharging to the tempering room.

From the above description it is seen that applicant has provided a simple, novel and efficient apparatus for handling the candy. The method and apparatus eliminates a great deal of labor and inconvenience. As above set forth, at certain times the process is a continuous one and the candy is automatically carried from the machines which make the pieces, to the enrobing machines and from the enrobing machines to the packing room.

It will, of course, be understood that various changes may be made in the form, details, arrangement and proportions of the apparatus and in the steps and sequence of steps of the method, without departing from the scope of applicant's invention, which, generally stated, consists in a method and apparatus capable of carrying out the objects above set forth, such as disclosed and defined in the appended claims.

What is claimed is:

1. An apparatus for the manufacture of candy, comprising one or more machines for making uncoated pieces of candy, located on one floor of a building, a tempering room disposed on a lower level, carriers receiving candy from said machines leading to said tempering room, means for receiving the pieces of candy from said carriers, one or more enrobing machines having receiving ends and located on a floor below said first mentioned floor, a conveyor leading from said tempering room to the receiving end of each of said enrobing machines, a packing room a tunnel leading from said enrobing machines beneath said tempering room to said packing room and a conveyor moving in said tunnel leading from said enrobing machines to said packing room.

2. An apparatus for the manufacture of candy, comprising one or more machines for making uncoated pieces of candy located on one floor of a building, a tempering room on a lower floor of said building, downwardly inclined conveying brushing and starch separating means receiving the candy from said machines and conveying the same to said tempering room, means in said tempering room receiving from said means, one or more enrobing machines having receiving ends and disposed on a floor below said second mentioned floor, a conveyor extending from said last mentioned means to the receiving end of each of said enrobing machines and means for reciprocating said last mentioned means to feed the candy to said conveyor.

3. An apparatus for the manufacture of candy, comprising one or more machines for making uncoated pieces of candy located on one floor of a building, a tempering room on a lower floor of said building, a downwardly inclined chute receiving the candy from said machines and conveying the same to said tempering room, said chute having starch separating means therein and having bottom portions discharging said starch, receptacles for receiving said starch discharged from said chute, means in said tempering room receiving the candy from said chute, one or more enrobing machines located on a floor below said second mentioned floor, a conveyor leading from said last mentioned means to each one of said enrobing machines and adapted to deliver candy to the receiving end thereof, means for reciprocating said last mentioned means to feed the candy to said conveyor, a tunnel passing beneath said tempering room to a packing room, and means conveying said pieces from said enrobing machines through said tunnel to said packing room.

In testimony whereof I affix my signature.

FRANK M. SCHULER.